United States Patent [19]

Freyre

[11] 4,443,066
[45] Apr. 17, 1984

[54] ACOUSTO-OPTICAL APPARATUS FOR SHIFTING A BEAM OF LIGHT

[75] Inventor: Frederick W. Freyre, West Wantagh, N.Y.

[73] Assignee: Hazeltine Corporation, Commack, N.Y.

[21] Appl. No.: 274,576

[22] Filed: Jun. 17, 1981

[51] Int. Cl.³ .............................................. G02F 1/11
[52] U.S. Cl. ..................................... 350/358; 350/354
[58] Field of Search ............ 350/358, 169, 356, 96.14, 350/96.13, 354, 371

[56] References Cited

U.S. PATENT DOCUMENTS 3,462,603  8/1969  Gordon ............................... 350/371
3,544,795 12/1970  Korpel ................................ 350/358
4,332,441  6/1982  Margolis ............................ 350/358

Primary Examiner—William L. Sikes
Assistant Examiner—Leon Scott, Jr.
Attorney, Agent, or Firm—E. A. Onders; F. R. Agovino

[57] ABSTRACT

Apparatus for translating the position of a coherent beam of light using one or more acousto-optical cells. The beam is incident upon an acousto-optical cell through which acoustic waves of a selected frequency are propagating. These acoustic waves cause periodic variations in the refractive index of the cell which act to diffract and frequency shift the beam by amounts which are determined by the frequency of the acoustic wave. The once-diffracted beam is reflected back through the acosto-optical cell in the opposite direction, which causes a diffraction and frequency shift which are equal and opposite to the initial diffraction and frequency shift. By varying the frequency of the propagating waves, the final output beam of coherent light can be translated without a frequency shift. Also disclosed are a dual, identical Bragg cell embodiment for translating a light beam and dual Bragg cells having differing acoustic propagation velocities for deflecting a light beam.

8 Claims, 5 Drawing Figures

ACOUSTO-OPTICAL APPARATUS FOR SHIFTING A BEAM OF LIGHT

BACKGROUND OF THE INVENTION

1. Field of the Invention

The invention relates generally to an apparatus for shifting the position of a beam of light and, in particular, to acousto-optical translators and deflectors which change the position of a beam of light without frequency shift for use in delay lines as disclosed in applicant's copending U.S. patent application Ser. No. 274,577 and in channelized receivers as disclosed in applicant's copending U.S. patent application Ser. No. 274,611, incorporated herein by reference, both of which are filed concurrently herewith.

2. Description of the Prior Art

Beam deflection can be accomplished acousto-optically as illustrated in FIG. 1 or electro-optically as illustrated in FIG. 2. Acousto-optical deflection employs a high interaction efficiency Bragg technique where the diffraction angle varies with the RF frequency (f) as follows:

$$\Delta\theta = (\lambda/V_a)\Delta f$$

where
$\Delta\theta = \theta'_B - \theta_B = \delta$
$V_a$ = velocity of propagation of acoustic waves through the Bragg cell
$\lambda$ = wavelength of incident light Variable RF voltage source 100 is connected to a piezoelectric transducer 101 coupled to one end of Bragg cell 103 and having an absorber 102 at the opposite end thereof. Source 100 activates transducer 101 to launch acoustic waves 104 along Bragg cell 103. Incident light 105 is deflected by angular amount $\delta$ and frequency shifted by the frequency of the waves. By adjusting the frequency of variable RF voltage source 100, the angle $\delta$ may be varied and the amount of beam deflection may be changed.

FIG. 2 illustrates an electro-optical system which uses a variable electric field to generate, in a suitable crystal, a spatial refractive index gradient that is transverse to the light path of the incident light to effect beam deflection. In particular, crystal 120 is comprised of upper portion 121 and lower portion 122. Each crystal is an electro-optical crystal material having a particular crystal lattice. An electric field is applied across the interface surface 124 between portions 121 and 122 by applying potential difference 123 to metalized surfaces 126 and 127. The electric field generated by potential difference 123 causes a spatial refractive index gradient along interface surface 124 and transverse to the light path of the incident light beam. This causes the transmitted beam to bend toward the region of higher index so that the output beam 125 is deflected.

SUMMARY OF THE INVENTION

It is an object of this invention to provide a beam translator which changes the position of a beam of light without frequency shifting the beam of light.

It is another object of this invention to provide an acousto-optical beam translator which is continuously variable.

The invention is an apparatus for translating a beam of light and includes a variable frequency signal source. An acousto-optical cell has a transducer connected to the signal source for launching acoustic waves through said cell. The waves correspond to signals from said source. The cell is also provided with an absorber for absorbing acoustic waves launched through the cell by the transducer. The beam of light is incident on the cell at a first acousto-optical angle of the cell. This results in a first transmitted beam of light which has been diffracted and transmitted through the cell in a given direction. Means are provided for reflecting the first transmitted beam of light back through the cell at a second acousto-optical angle of the cell resulting in a second transmitted beam of light diffracted and transmitted through the cell in a direction opposite to the given direction. By varying the frequency of the signal, the position of the second transmitted beam with respect to the acousto-optical cell is varied.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
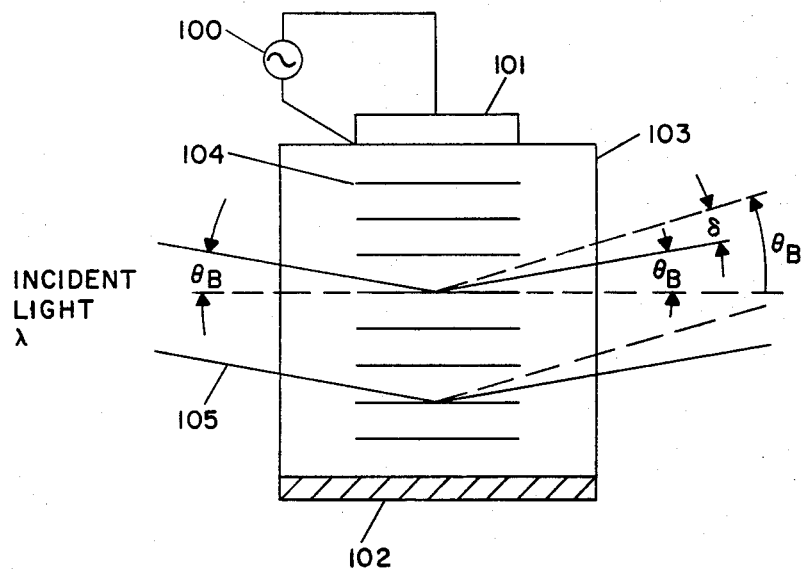
FIGS. 1 and 2 are illustrations of prior art coherent light beam deflection systems.
Figure 2:
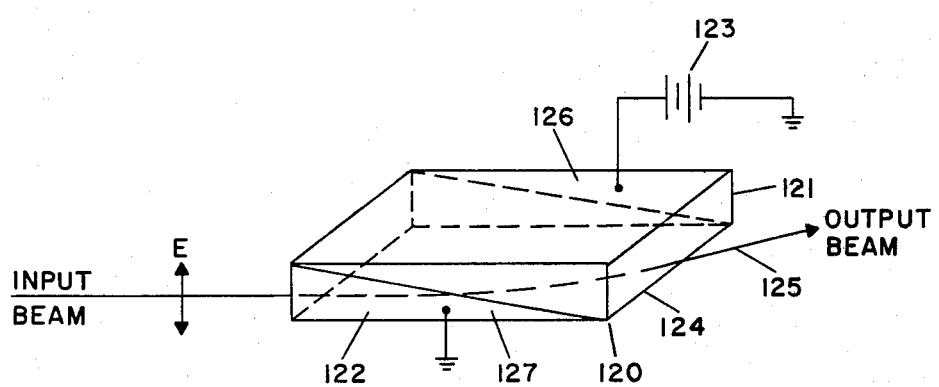

In many applications, the systems illustrated in FIGS. 1 and 2 are unacceptable. First of all, in many optical systems it is necessary to laterally translate a beam of light without changing the angular relationship between the incident beam, the translated beam and the acousto-optical cell. Second of all, in many systems it is necessary to translate a light beam without frequency shifting the translated beam; i.e., the incident and translated beams are required to be at the same frequency. These features are accomplished by the invention.

Figure 3:
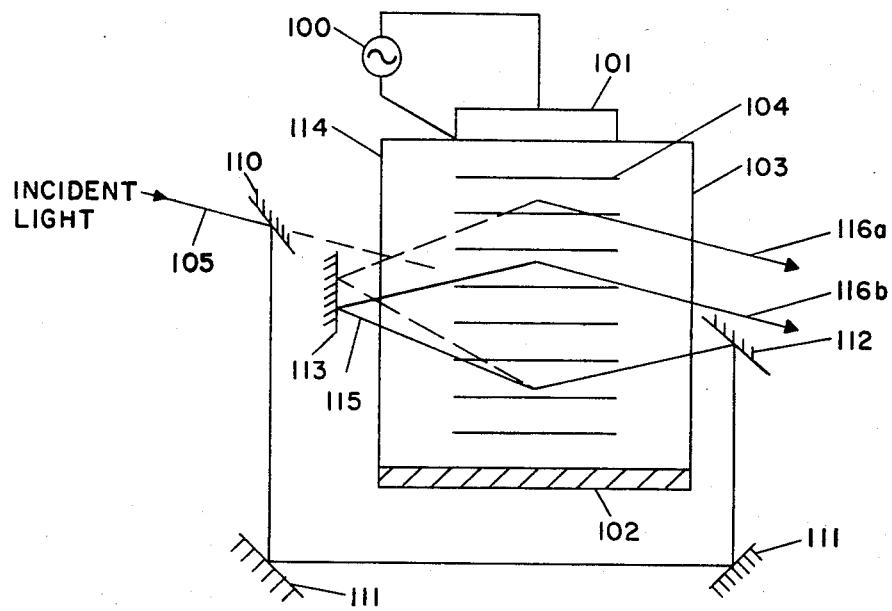
FIG. 3 illustrates an embodiment of a beam translator according to the invention.

In the preferred embodiment illustrated in FIG. 3, voltage source 100 is connected to piezoelectric shear wave transducer 101 associated with Bragg cell 103 at one end thereof and having an absorber 102 at an opposite end thereof. Source 100 may be any variable RF voltage source providing a signal which, when applied to piezoelectric transducer 101, results in acoustic waves being launched through Bragg cell 103. Although FIG. 3 specifically illustrates acousto-optical cell 103 as a Bragg cell, it may be any type of acousto-optical cell in which propagating acoustic waves result in periodic variations in the refractive index of the cell.

Incident light, such as coherent light from a laser, is reflected by beam splitters or mirrors 110, 111 and 112 so that the incident light is incident on Bragg cell 103 at a Bragg angle. Acoustic waves 104 launched in the Bragg cell 102 by transducer 101 cause a periodic change in the refractive index of cell 103, thereby diffracting the transmitted, incident light beam upward. The diffracted light beam 115 is reflected by mirror 113 and is again incident upon Bragg cell 103 at a Bragg angle wherein it is diffracted downward.

As discussed above, the diffraction angle varies in direct relation to the frequency of the acoustic waves. The frequency of the acoustic waves corresponds to the RF frequency of the signal applied to transducer 101. Therefore, by varying the frequency of RF voltage source 100, the diffraction angle may be increased or decreased. The result is lateral translation of output beam 116. Because the incident light is initially shifted downward in frequency and then, after reflection by mirror 113, is shifted upward in frequency by an equal amount, the net frequency shift of the incident beam of light, as compared to the output beam 116, is zero and the incident beam of light is spacially translated without frequency shift.

Figure 4:
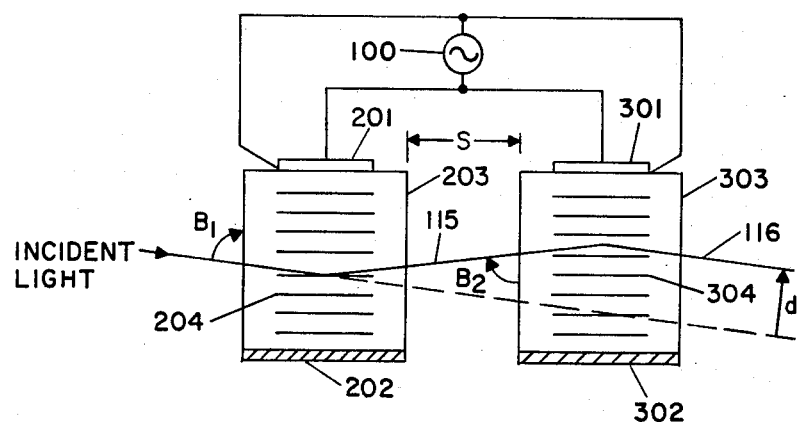
FIG. 4 illustrates another embodiment of a beam translator according to the invention.

FIG. 4 illustrates another embodiment of the invention. Voltage source 100 is connected to piezoelectric acoustic transducers 201, 301 associated with identical Bragg cells 203, 303 at one end thereof and having an absorber 202, 302 at an opposite end thereof. Source 100 may be any variable RF voltage source providing a signal which, when applied to piezoelectric transducers 201, 301, results in acoustic waves being launched through Bragg cells 203, 303.

Light, such as coherent light from a laser, is incident on Bragg cell 203 at a Bragg angle (B1). Acoustic waves 204 launched in Bragg cell 203 by transducer 201 cause a periodic change in the refractive index of cell 203, thereby diffracting the transmitted, incident light beam upward. The once diffracted light beam 115 is incident upon Bragg cell 303, which is spaced from Bragg cell 203 by distance S. Acoustic waves 304 launched in Bragg cell 303 by transducer 301 cause a periodic change in the refractive index of cell 303, thereby diffracting the transmitted, incident light beam downward. Due to the frequency shift discussed above, cell 203 shifts the frequency of the incident light downward and cell 303 shifts the frequency of the once diffracted, transmitted light beam 115 upward. The net frequency shift of the incident beam of light, as compared to the output beam 116, is dependent upon the upward and downward frequency shifts caused by cell 203 and by cell 303, respectively.

As illustrated in FIG. 4, the same signal from source 100 is applied to transducer 201 and transducer 301 so that the diffraction caused by each cell and the frequency shift caused by each cell are equal and opposite. Therefore, the net frequency shift of the incident beam of light, as compared to the output beam 116, is zero and the incident beam of light is laterally translated a distance d without frequency shift. By decreasing the distance S between cell 203 and cell 303, the translation distance d can be shortened; by increasing the distance between the cells, the translation distance d may be lengthened. Furthermore, additional cells may be cascaded in series with cells 203, 303 to cause additional lateral translation of transmitted light beam 116. In operation, varying the frequency of source 100 varies the translation distance d.

Figure 5:
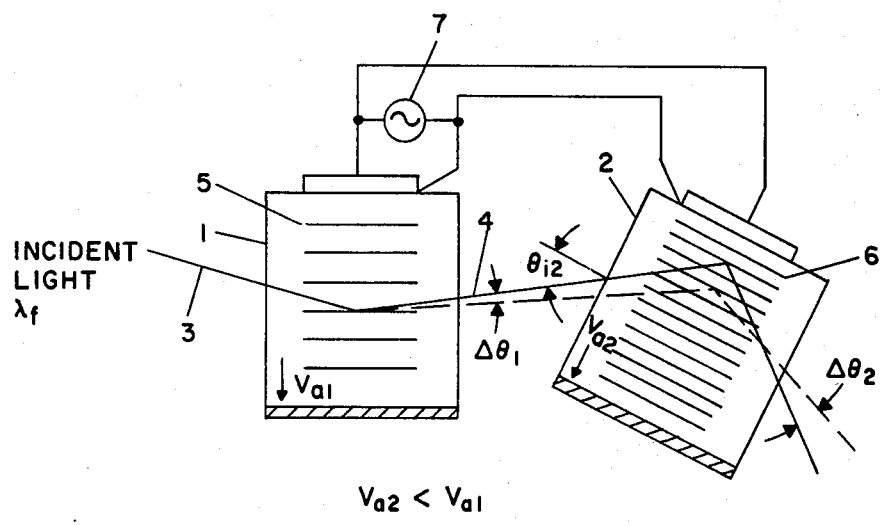
FIG. 5 illustrates an embodiment of a beam deflector according to the invention.

Zero frequency shift beam deflection may be accomplished with the double Bragg cell arrangement shown in FIG. 5. Bragg cells 1, 2 are dissimilar in that cell 2 comprises an acousto-optical medium through which acoustic waves propagate at a slower velocity ($V_{a2}$) than the acoustic propagation velocity ($V_{a1}$) of the acousto-optical medium of cell 1. The two dissimilar cells 1, 2 are oriented so that, at their design center frequencies (which may be equal), light 3 is incident at Bragg cell 1 at its acousto-optical angle and the resulting diffracted beam 4 is incident at cell 2 at its acousto-optical angle $\theta_{l2}$. Furthermore, cell 1 is oriented so that incident light 3 is downshifted in frequency as it is transmitted therethrough due to the acoustic waves 5 propagating therein. Similarly, cell 2 is oriented so that diffracted beam 4 is upshifted in frequency as it is transmitted therethrough due to the acoustic waves 6 propagating therein. Since cells 1, 2 have acoustic waves which are generated by the same frequency source 7, the frequency downshift in cell 1 is equal to the frequency upshift in cell 2 and the net frequency shift is zero. Specifically, assuming isotropic acousto-optic media for cells 1, 2, the overall diffraction angle variation versus frequency may be calculated as follows. The change in diffraction angle of cell 1 $\Delta\theta_1$ is given by the following equation:

$$\Delta\theta_1 = \frac{\lambda_f}{V_{a1}} \Delta f$$

Subscript 1 refers to cell 1 and subscript 2 refers to cell 2. Therefore, the change in diffraction angle in cell 2 ($\Delta\theta_2$) is given by:

$$\Delta\theta_2 = -\Delta\theta_1 + \frac{\lambda_f}{V_{a2}} \Delta f = \left( \frac{1}{V_{a2}} - \frac{1}{V_{a1}} \right) \lambda_f \Delta f$$

This second equation indicates that the slope of the deflection angle versus frequency increases with the increasing velocity difference.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for shifting a path of a beam of coherent light, comprising:
   (a) a first acousto-optical cell including a first transducer connected to a first signal source for launching acoustic waves in said cell, the period between said waves corresponding to the frequency of first signals from said first source, and a first absorber for absorbing acoustic waves which have traversed said cell, the beam of coherent light being incident on said cell at a first selected angle, said first cell diffracting by a first selectively variable angle corresponding to the first signal frequency and frequency shifting by a first selectively variable differential corresponding to the first signal frequency the supplied beam of coherent light to provide a once-diffracted, frequency shifted beam of light; and
   (b) a second acousto-optical cell including a second transducer connected to a second signal source for launching acoustic waves in said second cell, the period between said waves corresponding to the frequency of the second signals from said second source, and a second absorber for absorbing acoustic waves which have traversed said second cell, the once-diffracted, frequency-shifted beam of coherent light from said first cell being incident on said second cell at a second selected angle, said second cell diffracting by a second selectively variable angle corresponding to the second signal frequency and frequency shifting by a second selectively variable differential corresponding to the second signal frequency the once-diffracted, frequency-shifted beam of light, wherein said second selectively variable angle is in a direction opposite to said first selectively variable angle and said second selectively variable differential is in a direction opposite to said first selectively variable differential.

2. The apparatus of claim 1 wherein said second selectively variable angle has a magnitude equal to said first selectively variable angle and said second selectively variable differential has a magnitude equal to said first selectively variable differential.

3. The apparatus of claim 1 wherein said first and second sources comprise a single variable frequency signal source connected to said first and second transducers whereby varying the frequency of the signal provided by said variable frequency signal source varies the position of the second transmitted beam with respect to the acousto-optical cell.

4. The apparatus of claim 3 wherein said first cell comprises a first acousto-optical media having a given acoustic velocity and said second cell comprises a second acousto-optical media having an acoustic velocity greater than said given acoustic velocity.

5. Apparatus for shifting a path of a beam of coherent light comprising:
   (a) first means for supplying a variable frequency signal;
   (b) an acousto-optical cell including a transducer responsive to said variable frequency signal for launching acoustic waves in said cell, the period between said waves corresponding to the frequency of said signal, and an absorber for absorbing acoustic waves which have traversed said cell, whereby when a beam of coherent light is incident on said cell at a first selected angle said beam is transmitted through said cell and diffracted thereby; and
   (c) second means for reflecting said transmitted beam of light back onto said cell resulting in said transmitted beam being retransmitted through said cell, said second means reflecting said retransmitted beam onto said cell at a second selected angle such that said transmitted beam is diffracted by said cell in a direction opposite to the direction in which said transmitted beam is diffracted whereby varying the frequency of said signal causes the position of the retransmitted beam to be translated laterally with respect to the original incident beam of light.

6. The apparatus of claim 5 wherein said cell is a Bragg cell and said means for reflecting comprises one or more mirrors.

7. Apparatus for shifting a path of a beam of coherent light, comprising:
   (a) a variable frequency signal source;
   (b) an acousto-optical cell having first and third opposing sides and having second and fourth opposing sides substantially perpendicular to said first and third opposing sides;
   (c) a transducer connected to said source and attached to the first side of said cell for launching acoustic waves in said cell, the period between said waves corresponding to the frequency of signals from said source;
   (d) an absorber attached to the third side of said cell for absorbing acoustic waves which have traversed said cell;
   (e) means for directing the beam of light to be incident on the second side of said cell at a first acousto-optical angle of said cell resulting in a first transmitted beam of light transmitted through the fourth side of said cell; and
   (f) means for directing the first transmitted beam of light to be incident on the fourth side of said cell at a second acousto-optical angle of said cell resulting in a second transmitted beam of light emitted through the second side of said cell whereby varying the frequency of the source varies the position of the second transmitted beam with respect to said cell.

8. The apparatus of claim 7 wherein said cell is a Bragg cell.

* * * * *